(12) United States Patent
Khaje et al.

US010301705B2

(10) Patent No.: US 10,301,705 B2
(45) Date of Patent: May 28, 2019

(54) METHOD FOR PRODUCING ELECTROLYTE FOR VANADIUM BATTERIES FROM OIL SAND WASTE

(71) Applicant: EnSciTech Corp, Calgary (CA)

(72) Inventors: Kourosh Khaje, Calgary (CA); Maryam Mkhani, Calgary (CA)

(73) Assignee: Energy, Science and Technology Corporation, Calgary (CA)

( * ) Notice: Subject to any disclaimer, the term of this patent is extended or adjusted under 35 U.S.C. 154(b) by 0 days.

(21) Appl. No.: 15/476,890

(22) Filed: Mar. 31, 2017

(65) Prior Publication Data

US 2017/0349971 A1  Dec. 7, 2017

Related U.S. Application Data

(60) Provisional application No. 62/316,652, filed on Apr. 1, 2016.

(51) Int. Cl.
| | | |
|---|---|---|
| C22B 34/00 | (2006.01) | |
| C22B 34/22 | (2006.01) | |
| C01D 1/20 | (2006.01) | |
| C01G 31/02 | (2006.01) | |
| C22B 3/00 | (2006.01) | |
| C22B 7/00 | (2006.01) | |
| C01G 53/04 | (2006.01) | |

(52) U.S. Cl.
CPC .............. C22B 34/22 (2013.01); C01D 1/20 (2013.01); C01G 31/02 (2013.01); C01G 53/04 (2013.01); C22B 3/0001 (2013.01); C22B 7/002 (2013.01); C22B 7/007 (2013.01); Y02P 10/234 (2015.11)

(58) Field of Classification Search
CPC ..... C22B 34/22; C22B 7/007; C22B 23/0423; C22B 23/043; C01G 31/02
USPC ............... 423/65–68, 140–147, 150.1–150.6
See application file for complete search history.

(56) References Cited

U.S. PATENT DOCUMENTS

| | | | | |
|---|---|---|---|---|
| 4,539,186 A | * | 9/1985 | Schemel ................ | C01G 31/02 423/140 |
| 4,978,511 A | * | 12/1990 | Young .................... | C01G 31/00 423/321.1 |
| 6,306,356 B1 | * | 10/2001 | Woolery ................. | C22B 34/22 423/150.1 |
| 2005/0249652 A1 | * | 11/2005 | Scharifker ............... | C22B 3/08 423/66 |
| 2013/0078161 A1 | * | 3/2013 | Smith ...................... | A61L 2/04 422/292 |
| 2013/0078167 A1 | | 3/2013 | Grimley | |
| 2013/0091989 A1 | * | 4/2013 | Sun ........................ | C22B 7/007 75/739 |

FOREIGN PATENT DOCUMENTS

| | | | |
|---|---|---|---|
| CN | 103290240 A | * | 9/2013 |
| WO | 02/095855 | * | 11/2002 |

* cited by examiner

*Primary Examiner* — Steven J Bos
(74) *Attorney, Agent, or Firm* — MBM Intellectual Property Law LLP

(57) ABSTRACT

A method for recovering Vanadium from a secondary source such as fly ash. Leaching is involved using single or combined acids such as hydrochloric and sulfuric in a temperature range of 20° C. and 100° C. The leaching is performed in sequential operations with recovery of Vanadium in the range of 92%. The recovered Vanadium can be formulated into an electrolyte for redox batteries.

22 Claims, 6 Drawing Sheets

METHOD FOR PRODUCING ELECTROLYTE FOR VANADIUM BATTERIES FROM OIL SAND WASTE

FIELD OF THE INVENTION

The present invention relates to a method of recovering metal values from a secondary containing same and more particularly, the present invention relates to an electrolyte and battery incorporating same.

BACKGROUND OF THE INVENTION

Meeting global climate change goals means decreasing the use of coal and oil, and increasing use of natural gas and renewable energy. Under existing federal regulations, coal-fired power plants must meet GHG emission standards or retire when they reach 50 years of operation. Renewable energy is a solution to replace the coal-fired plants. This would mean market demand would rise for no-carbon energy sources. One challenge with renewable energy (i.e. solar and wind) for power generation is the intermittent nature of these energy sources. Energy storage technologies are key players for renewable energy to be used on demand when it is needed most, creating long-term benefit and reliability for years to come. Vanadium flow batteries are technologies providing long duration solutions over a 20+ year life for a broad range of applications including renewable energy integration and demand charge reduction. One of the biggest advantages of flow batteries is that replacing the electrolyte liquid, while simultaneously recovering the spent material for re-energization, can almost instantly recharge them.

A typical source of vanadium for vanadium redox batteries is created from mining. Governments around the world are looking at ways to secure environmentally friendly energy supplies. Traditionally "green" energy sources, such as solar and wind, are unreliable sources of electricity production and that is considered a big problem for the utilities that deliver power to consumers. The transmission grids need stable, predictable supplies of electricity; and that is where vanadium gets to play a role in the system. An emerging technology known as the vanadium redox-flow battery, can allow utilities to store the electricity generated by large-scale wind and solar farms until it's needed.

The prior art has extensive teachings in this area of technology. As an example, Grimely, in United States Patent Publication No. 2013/0078161, published Mar. 28, 2013, a method for recovering vanadium, nickel and molybdenum from the residue of the bottoms of heavy oil. The reference is focused on pyrolysis and combustion of the residues. Any discussion regarding the nickel fails to teach the use of a secondary source of the compound, latter such compounds having a much lower concentration than that realized for a secondary source commensurate with the technology.

Although a meritorious procedure, the Grimley publication does not disclose an efficient system, but rather one that is hampered by low concentration value content in the feedstock.

The presented technology targets the secondary vanadium electrolyte (VE). The main advantage in utilizing secondary vanadium source is the higher concentration of vanadium compared to that of a primary source (i.e. mine). The high concentration of vanadium as the secondary source will drive the production cost down.

The present technology transgresses the teachings of the prior art, thus providing for high efficiency as well as maximum recovery of metal values from a secondary source as opposed to a primary source obtained from mining.

SUMMARY OF THE INVENTION

One object of the present invention is to provide a significant improvement in the vanadium redox battery spectrum of technology.

A further object of one embodiment of the present invention is to provide a method for recovering vanadium from a secondary waste source containing vanadium, comprising:
  providing a waste feedstock containing the vanadium;
  providing a leaching solution of $H_2SO_4$ in a concentration between 3 Molar and 6 Molar;
  exposing the feedstock to the solution;
  maintaining a solution temperature of between 60° C. and 80° C.; and
  recovering a vanadium compound from the solution.

Of particular benefit is the fact that the instant technology results in the formation of high purity vanadium electrolyte, extracted and produced using secondary sources at a significantly lower cost. Further, implementation of the technology presents a unique opportunity in integrating a secondary source to VE market in Canada and the US to supply the energy storage and renewable energy market.

Another object of one embodiment of the present invention is to provide a method for forming a battery, comprising:
  providing a secondary source of vanadium;
  progressive extracting the vanadium in sequential dissolution operations;
  forming a vanadium electrolyte; and
  incorporating the electrolyte with battery components to form said battery.

In still another object of one embodiment of the present invention, there is provided a method for recovering vanadium from a secondary waste source containing vanadium, comprising:
  providing a waste feedstock containing the vanadium;
  providing a mixed leaching solution of $H_2SO_4$ and HCl in a molar ratio of 1:2;
  exposing the feedstock to said solution;
  maintaining a solution temperature of between 60° C. and 80° C., and
  recovering vanadium pentoxide from said solution.

By practice of the technology set forth herein, the result is a high quality, purified source of vanadium pentoxide ideally suited for use as an electrolyte.

Having thus generally described the invention, reference will now be made to the accompanying drawings illustrating preferred embodiments.

Figure 1:
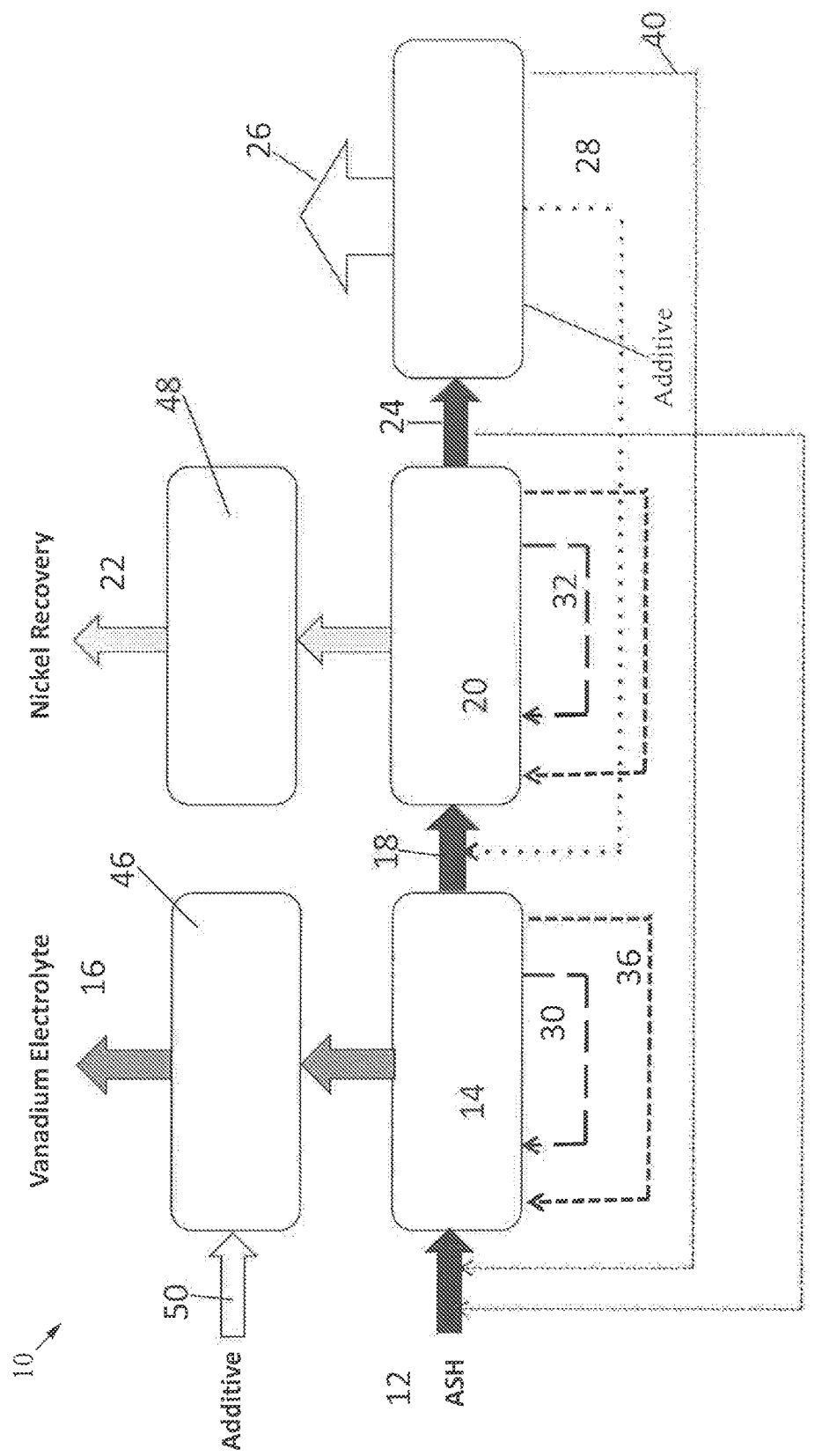
FIG. 1 is a schematic flow diagram of one embodiment of the present invention.

DETAILED DESCRIPTION OF THE
PREFERRED EMBODIMENTS

The secondary source of vanadium being leveraged in this technology is, for example: Fly/bottom ash from asphaltene gasification/combustion plant (SAGD producers i.e. Nexen, MEG energy, NWR); Petcoke ash (from oil sands/mining: Suncor, Syncrude); Coal ash (from coal power plants)

The Alberta Oil Sands industry is currently facing several challenges such as lowering oil price, strong competition from conventional oil production countries, environmental awareness and a social factor (employment market). Nevertheless, development of oil sands is a complex and energy/capital-intensive process. Oil sands waste management costs account for 15-30% of OPEX giving a cost of from 1.5-3 CAN$ per barrel of oil production. By considering the production projection in 2020, around 2.5-3 million barrels a day in Alberta, more efforts should be made to decrease the production cost and to diversify the mix of products. To utilize the first source of secondary vanadium listed above (i.e. Fly/bottom ash from asphaltene gasification/combustion). Currently all of the hazardous solid waste from production of oil sands is landfilled in Alberta. Metal extraction technology for mining (high TRL) has been used worldwide for more than 100 years. Recovering technologies for ash and used catalyst utilization have also been applied for more than 30 years around the world. In Alberta, the ash from industrial plants is considered as a high quality ash with regards to the high concentration of Va and Ni. Applying technologies to recover such high quality source of vanadium (and nickel) and to produce vanadium electrolyte ready to be used in vanadium redox batteries, is the innovative picture, that the instant brings as part of the solution to renewable energy storage. Generally, the technology is based on few multi-phase separation steps under controlled operations conditions (temperature, pH, pressure, concentration, etc.).

Extremely large capacities make vanadium redox batteries (VRBs) well suited to use in large power storage applications having an extremely rapid discharge capability—ideal for use in wind or solar energy storage. Vanadium demand in VRB applications conservatively projected to grow, worldwide, from 1,100 tones in 2012 to 8,500 tones in 2017.

Lithium vanadium phosphate batteries, on the other hand, produce higher voltages and improved energy for weight characteristics ideal for use in electric cars. Vanadium demand in lithium batteries is conservatively expected to grow from 200 tones in 2012 to 1,700 tones in 2017. Actual growth in demand for vanadium in energy storage applications could be significantly higher than these conservative projections over the next few years.

The technology set forth herein, when practiced for a vanadium recovery process, will produce very high demand products in energy storage current and future market. The technology requires less energy intensive process (compared to conventional vanadium extraction processes) with no waste stream out of the process. the design is closed loop; which means 2nd generation hazardous waste come to our process as feed and three product streams will be produced: Vanadium electrolyte, Nickel hydroxide and carbon (Nickel and carbon will be used in the anode production of VRB).

World Energy Outlook expects total renewables used in the electric power sector to increase by 8.7% in 2016 and by 6.5% in 2017. Forecast hydropower generation in the electric power sector increases by 5.4% in 2016 and by 2.8% in 2017. Renewables other than hydropower are projected to grow by 11.5% in 2016 and by 9.5% in 2017. Solar generation from both PV and solar thermal is projected to average 130 gigawatt hours per day (GWh/d) in 2017, an increase of 40% from the 2016 level as much of the new capacity comes online at the end of 2016. Forecast utility-scale solar power generation averages 1.1% of total U.S. electricity generation in 2017. The rapid growth in variable renewable energy, namely solar PV and wind, is catalyzing efforts to modernize the electricity system. At high levels of penetration, variable renewable energy increases the need for resources that contribute to system flexibility. This ensures that system stability is maintained by matching supply and demand of electricity. Battery storage is one of the options for enhancing system flexibility in these circumstances by managing electricity supply fluctuations.

Government support has been a key driver for demonstration battery storage projects all over the world, and have built a productive foundation of operational knowledge, data and industry participation. USA, China, Japan and Germany are leading the implementation of battery storage. Other countries, including Italy and South Korea, are following close behind. It is clear that increased variable renewable energy is one key driver everywhere as countries seek to improve system flexibility, maximize renewable resource feed-in and develop alternative technologies.

Vanadium and vanadium based products, are amongst key enablers for maximizing renewable energy integration into energy mix. Large companies make vanadium redox batteries (VRBs) well suited to use in large power storage applications having an extremely rapid discharge capability, ideal for use in wind or solar energy storage. Vanadium demand in VRB applications conservatively projected to grow, worldwide, from 1,100 tones in 2012 to 8,500 tones in 2017. Vanadium is also used in lithium batteries. Lithium vanadium phosphate batteries are used for greening transportation, as these batteries produce higher voltages and improved energy for weight characteristics ideal for use in electric cars. Vanadium demand in these lithium batteries is expected to grow from 200 tones in 2012 to 1,700 tones in 2017. Actual growth in demand for vanadium in energy storage applications could be significantly higher than these conservative projections over the next few years.

Though initial market for vanadium in batteries, is supplied via primary sources (i.e. vanadium mining), oil sands waste in Alberta can potentially be a significant secondary source which can be integrated into market suppliers for this product. Market analysis shows, the market for battery storage technologies has developed rapidly over the last couple of years and is anticipated to grow. Previously, the market for power sector battery storage was dominated by sodium-sulphur batteries made by NGK Insulators in Japan. This has shifted recently towards lithium-ion chemistries due to current cost, performance and safety advantages over other battery types. The shift has been incentivized by governmental support and the influence of other sectors.

The overall market is set to expand dramatically in the coming decade. A variety of battery types and designs will remain active in various niches of the field. While lithium ion is a popular battery at present, advanced lead acid, flow batteries and less developed batteries have also made significant progress. A healthy diversity of options such as vanadium redox batteries will remain given the versatility of battery technology in a variety of applications.

Vanadium has broad applications in various fields, including as an alloying elements in steelmaking. The annual vanadium production for steelmaking industry was approximately 60,000 tons in 2008, with about 5% yearly increase in vanadium consumption due to demand in further development in high strength low alloy steel. Although the primary source for vanadium recovery is mining and mainly from S. Africa, China and Russia, for a comprehensive valorization of industrial resources, it would be more beneficial to develop a processing route to utilize valuables such as vanadium from waste streams. So far, no prior initiative is found in the combined waste processing technology for vanadium electrolyte production. The closest approach relevant to the method set herein is a research study from Delft University of Technology in the Netherlands, which is focused on direct FeV production from power plant fly ash for steelmaking industry.

Fly/Bottom ash generated in gasification of asphaltene in oil sands plants, (as well as other ash streams generated in coal power plants), is a solid residue which is a valuable source of vanadium and nickel. Stricter environmental regulations for landfilling of ash waste from one side, and increased market potential and sustainable material utilization demand high vanadium recovery and safer treatment. Several processes are available, and reported in the literature for extracting vanadium from primary source (mining) and from waste ash streams in petroleum and heavy oil residues. The effort is, however, mainly focused on selective leaching of vanadium and then roasting to vanadium pentoxide.

Referring now to FIG. 1, shown is a schematic drawing of one possible method in general overview.

Numeral 10, denotes the overall method. Initially, the feedstock 12, shown in the example as ash is exposed to a first leaching operation 14. The ash 12 contains the metal values, namely vanadium and nickel for recovery. From the first leaching operation 14, a quantity of vanadium electrolyte is recovered, denoted by numeral 16 leaving a first processed solution 18. Solution 18 is exposed to a second leaching operation 20 in order to recover nickel hydroxide 22. This leaves a second processed solution 24 which is then passed onto a third stage where carbon black 26 is removed from the system and water is recycled as denoted by numeral 28. From the leaching operation 20, processing chemicals are recycled at 32.

As an option, depending on the desired outcome from practicing the method, the second processed solution 2 may be retreated in the first leaching operation 14 subsequent to the removal of the vanadium electrolyte to recover any residual vanadium electrolyte. This possibility is illustrated in the Figure by circuit 34. The result of this unit operation is a third processed solution which may then be retreated in the second leaching operation 20 to recover any residual nickel hydroxide.

Further still, the method may be repeated in its entirety either with or without removal of the vanadium electrolyte 16 and nickel hydroxide 22.

As a further option to enhance the recovery process, a suitable chelating agent 40 may be added along with the initial feedstock 12 or subsequent to any or all of the operations described supra.

The leaching operations 14 and 20 comprise leaching operations, similar to those documented. As noted in the preliminary statements in the background, making use of the secondary source for the feedstock has a substantial impact on concentration possibilities for the vanadium, but further circumvents the exorbitant cost associated with using mined compounds. It is noted herein that the feedstock characterized in this method is typically discarded for landfill. The underlying positive economics of this point are clear owing to the fact that the carbon black and nickel hydroxide are saleable commodities.

Depending on the result, the vanadium electrolyte 16 and nickel hydroxide 22 may be further treated to a purification operation 46, 48, respectively. Further enhancements include the provision of an additive addition 50. Suitable additives will be apparent to those skilled, however an example is an agglomerating agent. The carbon recovery may also include a purification operation.

Turning to the battery facet of this technology, the vanadium electrolyte can be used in a battery for use as a power source. The battery and electrolyte are not shown, since these things are well documented in the art.

Figure 2:
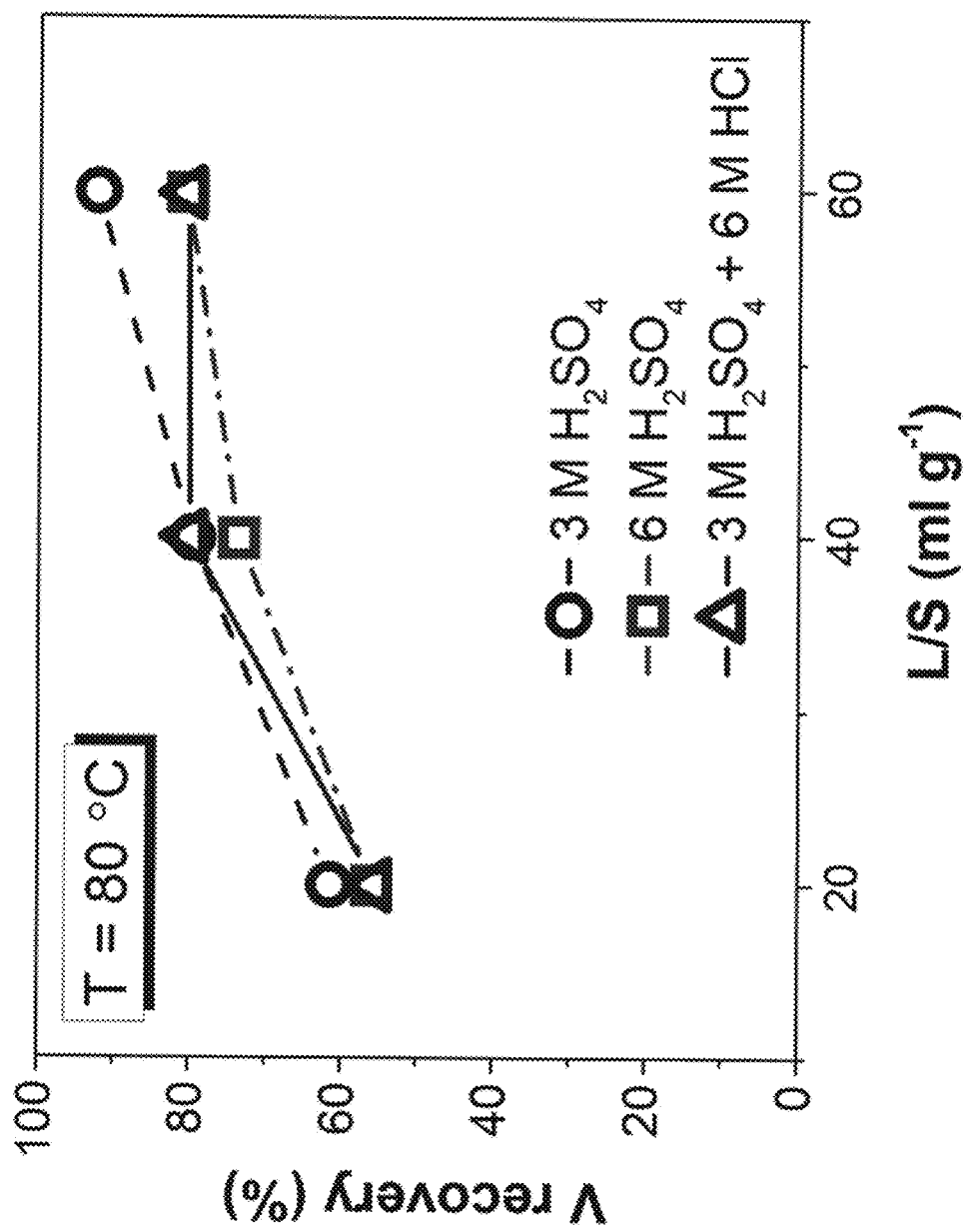
FIG. 2 is a graphical representation of the percentage of Vanadium recovered as a function of the liquid to solid ratio for different acids at 80° C.

In greater detail, the optimum operating conditions will now be discussed. FIG. 2 is a graphical illustration of Vanadium recovery as a function of the liquid solid ratio for different acids, namely sulfuric and hydrochloric acids at a temperature of 80° C. From the data, it is established that good Vanadium recovery is achievable with an L/S ratio of from 20 mlg$^{-1}$ to 60 mlg$^{-1}$, and that using 3 Molar sulfuric acid with an L/S ratio of 60 mlg$^{-1}$ results in 92% recovery, 6 Molar sulfuric acid and a mixed acid of sulfuric and hydrochloric of 3 Molar and 6 Molar, respectively with recovery of greater than 80% recovery.

Figure 3:
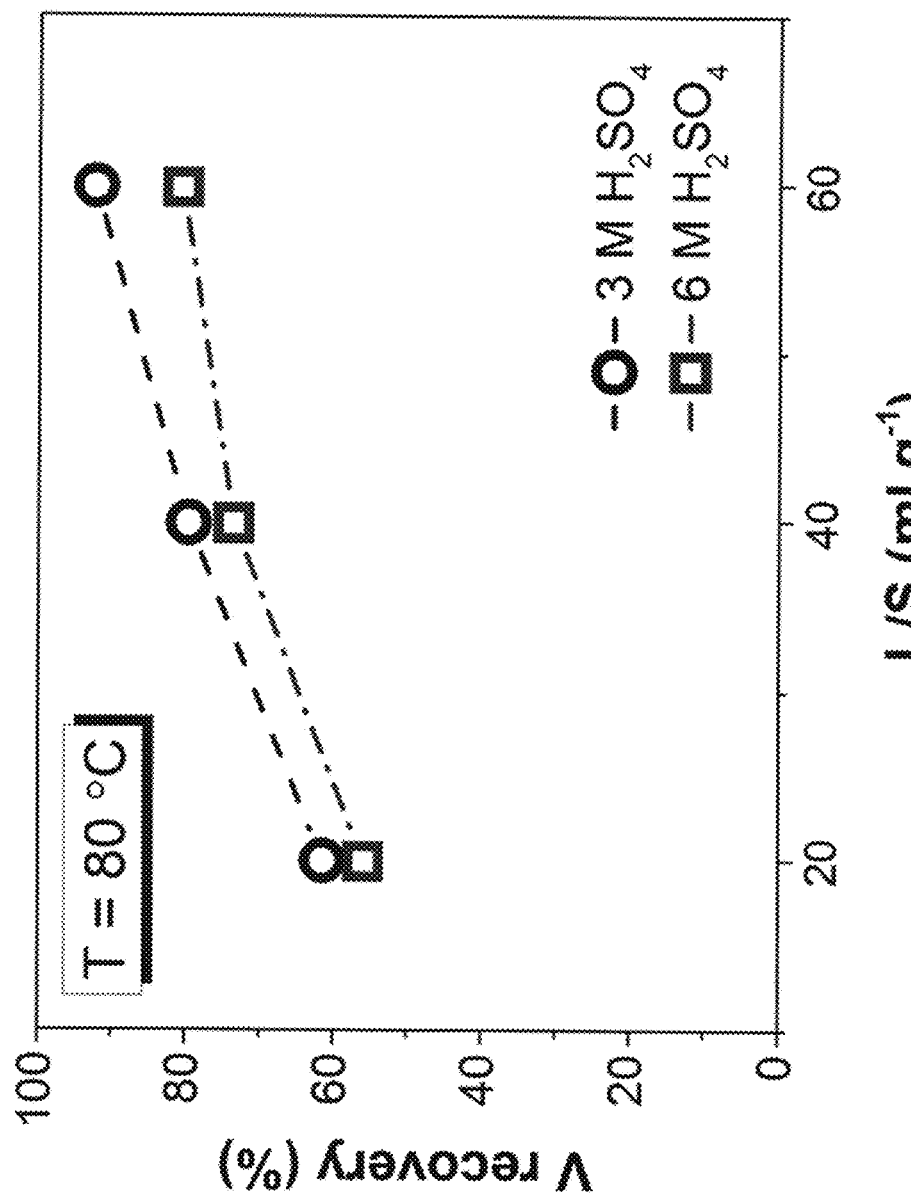
FIG. 3 is a graphical representation of the percentage of Vanadium recovered as a function of the liquid to solid ratio for different Molarities of $H_2SO_4$.

Referring now to FIG. 3, similar results are shown to those in FIG. 2, isolating the 3 Molar and 6 Molar sulfuric acid. This illustrates that increasing sulfuric acid concentration results in lower Vanadium recovery.

Figure 4:
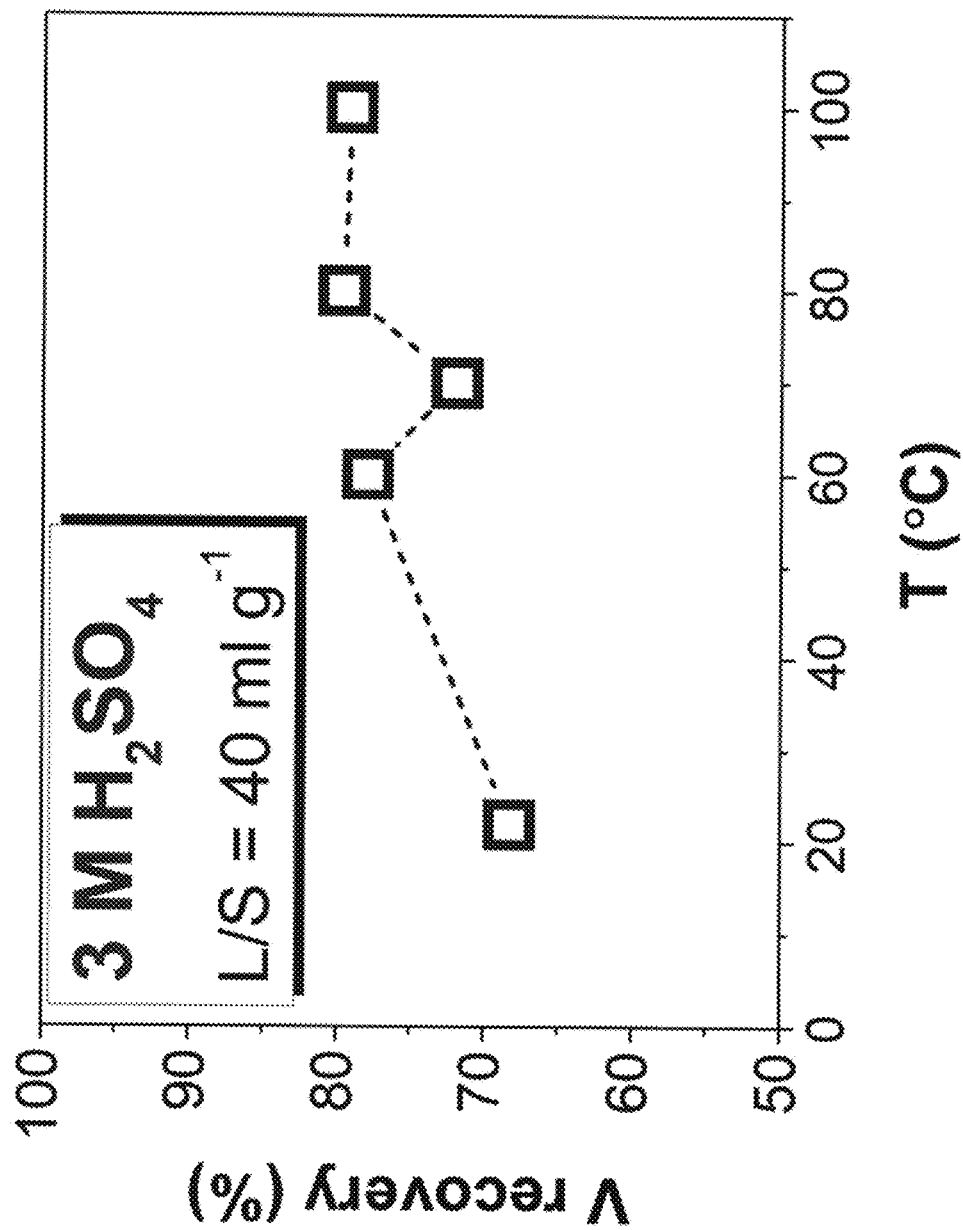
FIG. 4 is a graphical representation of the Vanadium recovered as a function of temperature.
Figure 5:
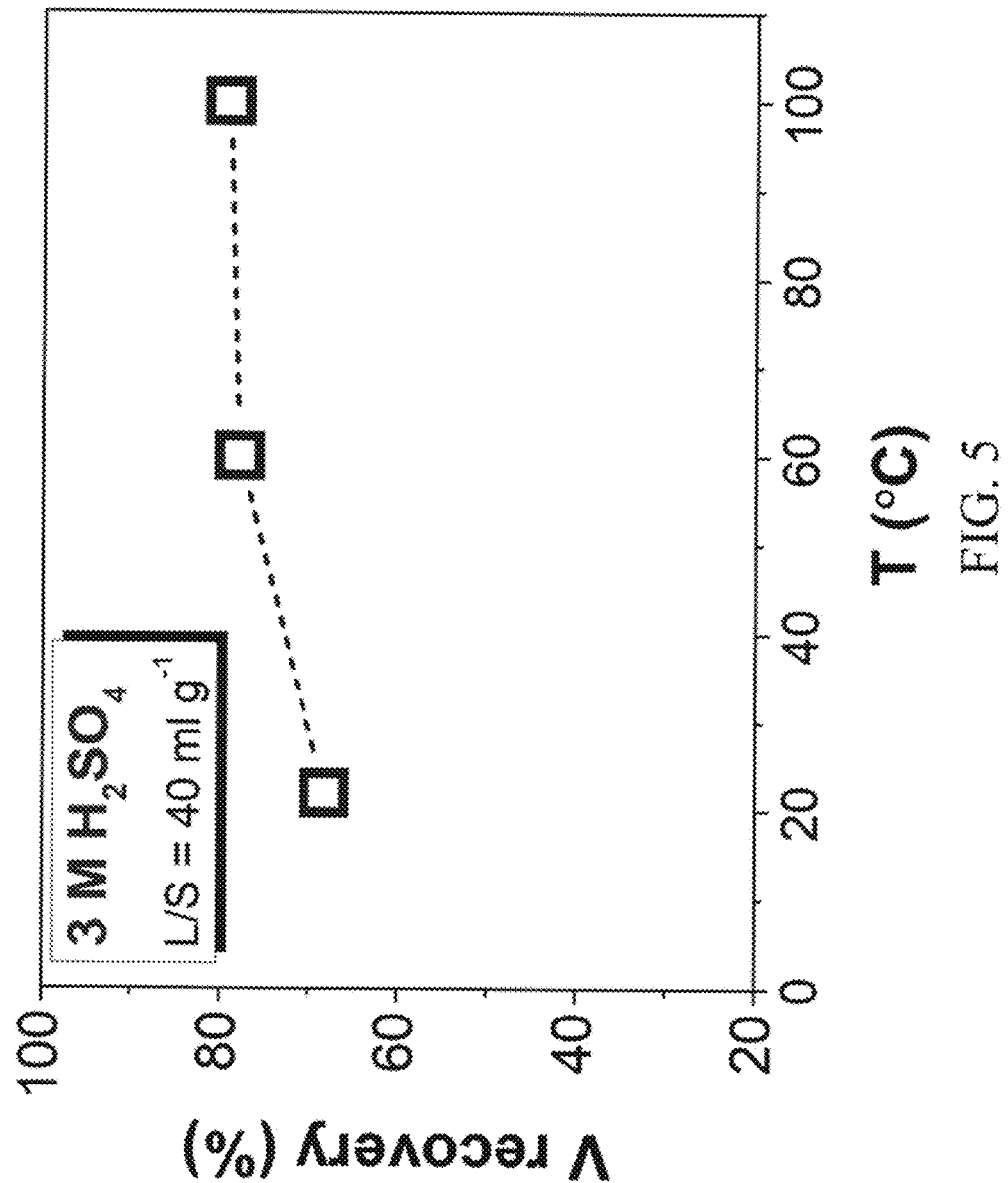
FIG. 5 is a graphical representation of the Vanadium recovered as a function of temperature at 20° C., 60° C. and 80° C.

FIG. 4 depicts data regarding the temperature effect on Vanadium recovery. For a 3 Molar solution, the data illustrates that a range of between 60° C. and 80° C. at an L/S ratio of 40 mlg$^{-1}$ provides good recovery. FIG. 5, confirms that a suitable temperature range is between 20° C. and 100° C. for the recovery of Vanadium.

Figure 6:
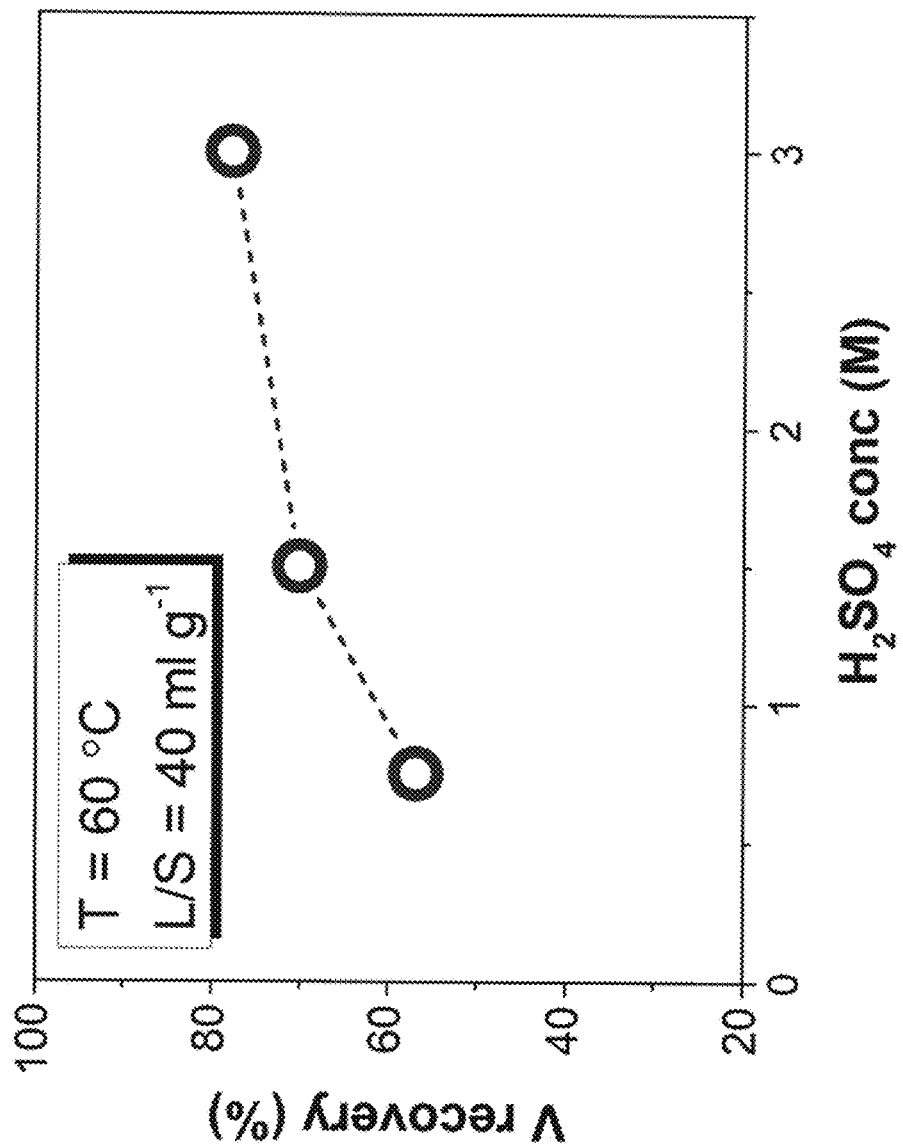
FIG. 6 is a graphical representation of the percentage of Vanadium recovered as a function of $H_2SO_4$ concentration.

FIG. 6 illustrates Vanadium recovery as a function of sulfuric acid concentration at a temperature of 60° C. and L/S of 40 mlg$^{-1}$. As shown, a suitable range for Vanadium recovery is between 0.7 Molar and 3 Molar sulfuric acid.

In summary, the technology delineated herein results in an elegant recovery of metal values from a secondary source with the concomitant beneficial economics, a highly efficient vanadium electrolyte and use of the electrolyte in a redox battery.

We claim:

1. A method of recovering a vanadium electrolyte from an ash stream containing vanadium, comprising:
   contacting the ash stream with an acid solution forming a mixture, wherein the acid solution comprises $H_2SO_4$ at a concentration of from 3 molar to 6 molar;
   wherein the mixture has a liquid to solid ratio (L/S ratio) of from 20 mlg$^{-1}$ to 60 mlg$^{-1}$;
   maintaining the mixture at a temperature from 20° C. to 100° C.; and
   separating the vanadium electrolyte from the mixture.

2. The method of claim 1, wherein the acid solution comprises $H_2SO_4$ solution having a molar concentration of 3M.

3. The method of claim 1, wherein the temperature is from 60° C. to 80° C.

4. The method of claim 1, wherein the temperature is maintained at 80° C.

5. The method of claim 1, wherein the temperature is maintained at 60° C.

6. The method of claim 1, wherein the L/S ratio is 40 mlg$^{-1}$.

7. The method of claim 1, wherein the L/S ratio is 60 $mlg^{-1}$.

8. The method of claim 1, wherein the acid solution comprises 3 molar $H_2SO_4$ and 6 molar HCl.

9. The method of claim 8, wherein the temperature is from 60° C. to 80° C.

10. The method of claim 8, further comprising incorporating the vanadium electrolyte into a redox battery.

11. The method of claim 8, wherein the temperature is maintained at 80° C.

12. The method of claim 8, wherein the temperature is maintained at 60° C.

13. The method of claim 8, wherein said L/S ratio is 40 $mlg^{-1}$.

14. The method of claim 8, wherein said L/S ratio is 60 $mlg^{-1}$.

15. The method of claim 1, further comprising separating additional compounds from said ash stream.

16. The method of claim 15, wherein the additional compounds comprise nickel compounds.

17. The method of claim 1, wherein the ash stream comprises flexicoke fly ash, petcoke ash and/or asphaltene gasification/combustion plant ash.

18. The method of claim 1, wherein the ash stream comprises asphaltene gasification/combustion plant ash.

19. The method of claim 1, further comprising incorporating the vanadium electrolyte into a redox battery.

20. A method for recovering a vanadium electrolyte from an ash stream containing vanadium, comprising:
    contacting the ash stream with an acid solution comprising $H_2SO_4$ and HCl in a molar ratio of 1:2 forming a mixture;
    maintaining the mixture at a temperature of from 60° C. to 80° C.;
    recovering the vanadium electrolyte from the mixture;
    wherein the ash stream is obtained from an asphaltene gasification/combustion plant, oil sands and/or coal power plants.

21. The method of claim 20, wherein the $H_2SO_4$ is at a concentration of 3M and the HCl is at a concentration of 6M.

22. The method of claim 21, wherein the mixture comprises a liquid to solid ratio (L/S ratio) of from 20 $mlg^{-1}$ to 60 $mlg^{-1}$.

* * * * *